G. & A. RAYMOND.
Mechanical-Movement.
No. 212,112.        Patented Feb. 11, 1879.
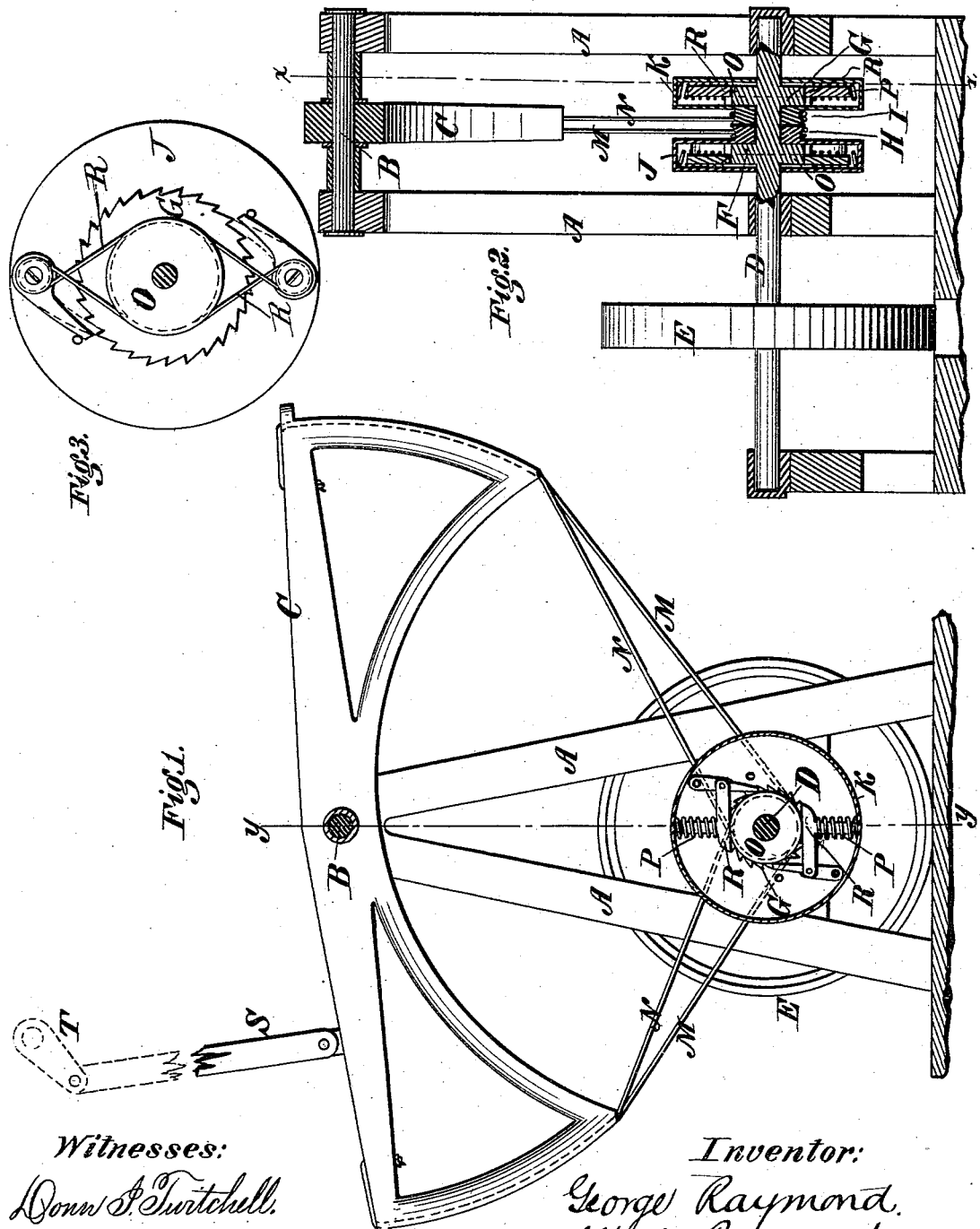
Witnesses:
Donn P. Twitchell.
S. M. Madden.
Inventor:
George Raymond.
Albert Raymond.
By their attys.
Dodgerson

UNITED STATES PATENT OFFICE.

GEORGE RAYMOND AND ALBERT RAYMOND, OF WAUPUN, WISCONSIN.

IMPROVEMENT IN MECHANICAL MOVEMENTS.

Specification forming part of Letters Patent No. 212,112, dated February 11, 1879; application filed December 19, 1878.

*To all whom it may concern:*

Be it known that we, GEORGE RAYMOND and ALBERT RAYMOND, of Waupun, in the county of Fond du Lac and State of Wisconsin, have invented certain Improvements in Mechanical Movements, of which the following is a specification:

This invention relates to an improved apparatus for converting a reciprocating into a rotary motion, intended more especially for use in connection with the pitmen of wind-mills.

The invention consists mainly in a special combination and arrangement of a walking-beam, cords connected therewith, and clutches mounted upon and having a pawl-and-ratchet connection with the shaft, and in a peculiar arrangement for throwing the pawls into and out of action and rendering them noiseless as the clutches are turned backward.

Figure 1 represents a vertical section of the apparatus on the line *x x* of Fig. 2; Fig. 2, a vertical cross-section of the same on the line *y y* of Fig. 1; Fig. 3, a view, showing a modified arrangement of the pawls.

Referring to the drawings, A represents a rigid upright frame, provided at its top with a transverse horizontal shaft, B, on which latter there is mounted at its middle a walking-beam, C, the ends of which are widened and curved in the manner shown. D represents a horizontal shaft, extending through the lower part of the frame and mounted in suitable bearings, in which it is free to rotate. This shaft is provided, as shown in Figs. 1 and 2, with a band-wheel or pulley, E, which may also be made to serve as a fly-wheel, and with two ratchet-wheels, F and G, which are secured rigidly upon the shaft. By the sides of the respective ratchet-wheels F and G on the shaft we mount two loose pulleys, H I, provided with extended circular arms or cases J K, each case containing one, two, or more pawls, arranged to engage with a corresponding ratchet-wheel.

To the walking-beam, and extending from end to end of the same, we attach two cords, M and N, passing around the pulleys H I, respectively, in the manner shown in Figs. 1 and 2, the former passing under and thence over the pulley H, while the latter extends over and thence under the pulley I, as represented. The vibration of the walking-beam C causes the cords M N to be drawn endwise upon the pulleys first in one direction and then in the other, thereby imparting to the pulleys and their cases a rotary motion, causing the pulleys to act upon the ratchet-wheels, and thereby rotate the main shaft D and its wheel E.

By passing the cords around their respective pulleys in opposite directions, as described and shown, their movement causes the pulley or clutch wheels to turn in opposite directions, one being turned backward as the other is turned forward, this motion causing the two wheels to act alternately to produce a forward motion of the shaft, and thus imparting to the shaft a continuous forward motion.

The form and arrangement of the pawls and clutches may be modified without affecting the operation of the apparatus. Any suitable means may be provided for tightening the cords M N, and the ends of the walking-beam may be curved in such manner as to secure a uniform tension of the cords during the entire movement of the beam.

For the purpose of throwing the pawls into and out of action with a positive motion, and of avoiding the ordinary unpleasant sound produced by them when running backward over the ratchet-wheel, we place by the side of each ratchet-wheel a smooth pulley, O, and connect to each pulley a pivoted arm, bearing upon the periphery of the smooth pulley, and held down thereon by means of the spring P, as shown in Fig. 1.

When the pulley is turned forward the friction of the arm R upon the pulley O causes the arm to draw the pawl downward into the ratchet-wheel, and as the pulley is turned backward the arm R in like manner forces it upward clear of the ratchet-wheel, and holds it in that position as long as the backward motion continues. Instead of using the rigid arm R and spring P, the same result may be secured by the arrangement represented in Fig. 3, in which the cord or belt R is passed around the smooth pulley O, and connected to the pulley on opposite sides of its pivot. The movement of the pulley causes the band or belt to throw it upward or downward, according to the direction of the movement.

In using the apparatus the walking-beam is connected to a bar or pitman, S, connected directly or indirectly to the crank T of an ordinary windmill.

We are aware that a friction-dog has been connected with a pawl, and arranged to bear upon the teeth of a ratchet-wheel, into which the pawl engaged, and this we do not claim, our device differing therefrom in the use of a separate smooth wheel and a dog resting thereon, whereby the device is rendered noiseless in its action, and the grinding and wearing action on the edges of the teeth avoided.

Having thus described our invention, what we claim is—

1. The herein-described apparatus for transmitting rotary motion from a wind-wheel, consisting in the combination of a crank, T, attached to the wheel, a connecting-bar, S, extending therefrom, beam C, connected to bar S, clutch-wheels J K, and cords M N, combined and arranged to operate as shown and described.

2. In combination with a ratchet-wheel, a smooth wheel, O, attached thereto, a wheel provided with a pawl, and a friction device, R, connected to the pawl and bearing on the smooth wheel, as shown.

3. In combination with the ratchet-wheel and pawl, the smooth pulley and the cord R, as shown.

GEORGE RAYMOND.
ALBERT RAYMOND.

Witnesses:
J. W. OLIVER,
S. J. MORSE.